United States Patent [19]

Stafford et al.

[11] Patent Number: 4,540,884

[45] Date of Patent: Sep. 10, 1985

[54] METHOD OF MASS ANALYZING A SAMPLE BY USE OF A QUADRUPOLE ION TRAP

[75] Inventors: George C. Stafford; Paul E. Kelley; David R. Stephens, all of San Jose, Calif.

[73] Assignee: Finnigan Corporation, San Jose, Calif.

[21] Appl. No.: 454,351

[22] Filed: Dec. 29, 1982

[51] Int. Cl.[3] .............. B01D 59/44

[52] U.S. Cl. .............. 250/282; 250/286; 250/288; 250/292

[58] Field of Search .............. 250/291, 292, 282, 281, 250/286

[56] References Cited

U.S. PATENT DOCUMENTS

| | | | |
|---|---|---|---|
| 2,939,952 | 6/1960 | Paul et al. | 250/41.9 |
| 3,527,939 | 9/1970 | Dawson et al. | 250/41.9 |
| 3,742,212 | 6/1973 | McIver | 250/286 |
| 4,105,917 | 8/1978 | McIver et al. | 250/292 |

OTHER PUBLICATIONS

Quadrupole Mass Spectrometry and its Applications, edited by P. H. Dawson, published by Elsevier 1976, pp. 4–6, 181–224.

Dynamic Mass Spectrometry, vol. 5, edited by Price and Todd, Heyden and Son, 1978, pp. 71–85.

Chemistry in Britain 1972, pp. 373–380.

*Primary Examiner*—Bruce C. Anderson

*Attorney, Agent, or Firm*—Flehr, Hohbach, Test, Albritton & Herbert

[57] ABSTRACT

In a quadrupole ion store or ion trap type mass spectometer, significantly improved mass selection is achieved by simultaneously trapping ions within the mass range of interest and then scanning the applied RF and DC voltages or the frequency ω to sequentially render unstable trapped ions of consecutive specific masses. These are passed out through apertures in an end cap to a high gain electron multiplier to provide a signal indicative of the ion mass. Sensitivity and mass resolution is also enhanced by operating the ion trap at a relatively high pressure in the range $1\times10^{-1}$ to $1\times10^{-5}$ torr. The presence of collision gas molecules, such as helium, improves sensitivity and mass resolution. In addition, the structure itself is built of stacked units, sealed by O-rings, which are easily disassembled for cleaning.

23 Claims, 12 Drawing Figures

METHOD OF MASS ANALYZING A SAMPLE BY USE OF A QUADRUPOLE ION TRAP

The present invention is directed to a method of mass analyzing a sample by use of a quadrupole ion trap.

An ion trap mass spectrometer (MS) is described in the Paul et al U.S. Pat. No. 2,939,952 dated June 7, 1960. Actually in broader terms it is termed a quadrupole ion store. In general, a hyperbolic electric field provides an ion storage region by the use of either a hyperbolic electrode structure or a spherical electrode structure which provides an equivalent hyperbolic trapping field.

A more standard type of mass spectrometer uses a quadrupole filter which consists of four cylindrical rods. In the past, the ion trap MS has been operated in a mode very similar to conventional quadrupole mass spectrometers where only one nominal mass is trapped at one time and then sensed. But because of difficulties related to general performance of this type of spectrometer it has not been commercially successful.

In the introduction to the book "Quadrupole Mass Spectrometry and its Applications", edited by P. H. Dawson, published by Elsevier, Amsterdam, 1976, pages 4–6, Dawson characterized the development and future of ion trap mass spectrometer technology as follows:

The quadrupole ion trap represents a rather special case. The three-dimensional quadrupole field was described in the original Paul patents and the feasibility of the principle of ion storage was demonstrated by Berkling and Fischer. However, not much attention was paid to the development of this unusual device. It was very soon applied by Wuerker et al to trap macroscopic particles and by Dehmelt to confine ions in order to perform spectroscopic measurements. The application to gas analysis did not progress until the publication by Rettinghaus in 1967 and then the extensive investigations of Dawson and Whetten beginning in 1968 marked the awakening of a much wider interest. (See Chapters VIII and X for the application to atomic and molecular physics.) The importance of the trapping technique may well lie mainly in its specialized applications.

In this same book (page 181) in a chapter entitled "Quadrupole Ion Traps" authored by Todd, Lawson and Bonner the following is stated:

"The three electrode ion trap was, of course, first developed for use as a mass spectrometer and this is the chief application to which the device has been put. Despite this attention, however, no manufacturer has thought fit to develop the trap as a commercially available instrument."

This book was published more than 16 years after the basic ion trap patent to Paul was issued in 1960.

Mass storage is achieved by operating the trap electrodes with values of RF voltage, V, and frequency, f, d.c. voltage, U, and device size, $r_o$, such that ions with a range of charge to mass ratio values are stably trapped within the device. These parameters will be referred to as scanning parameters and have a fixed relationship to the trapped masses. For stable ions there exists a distinctive secular frequency for each value of charge to mass. For detection of the ions these frequencies can be determined by a frequency tuned circuit which couples to the oscillating motion of the ions within the trap, and then by use of analyzing techniques charge to mass ratio may be determined.

The other mode of operation, the ion storage mode, relates more to typical MS techniques where, in the Mathieu curves, (FIG. 4), a designated normal scanning line selects ions of only one mass at a time. That is, the other ions are unstable and untrappable. And then applying a voltage pulse between the end caps the trapped stable ions are ejected out of the storage region to a detector. To select a given charge to mass ratio the appropriate voltages, V, U and a radio frequency (f) must be applied.

Thus, in summary, as pointed out by the quoted text above, no commercial ion traps have yet been built. And this is because these mass selection techniques are inefficient, difficult to implement, and yield poor mass resolution and limited mass range. These are all relative to the more standard quadrupole mass filter methods and apparatus.

Thus, it is an object of this invention to provide an improved ion trap mass spectrometer.

In accordance with the above object, there is provided a method of mass analyzing a sample which comprises the steps of ionizing the sample to form ions indicative of the sample constituents. The ions are temporarily trapped in an ion storage apparatus by application of suitable d.c. and RF voltages to electrodes that provide a substantially hyperbolic electric field within the ion storage apparatus. The amplitude of the applied voltages are then varied between predetermined limits. Ions of specific charge to mass ratios then become sequentially and selectively unstable and exit from the ion trap. The unstable ions are detected as they exit the ion trap and the detector provides an indication of the unstable ions. The ions are identified by the scanning parameters at which they become unstable.

In addition, for increased sensitivity and mass resolution, the device may be operated in a specific embodiment with collision gas molecules at a pressure in the range of $1\times10^{-5}$ to $1\times10^{-1}$ torr to enhance the mass resolution and sensitivity.

Lastly, a simplified structure for the ion storage apparatus using stacked units and O-ring seals is provided.

Figure 1:
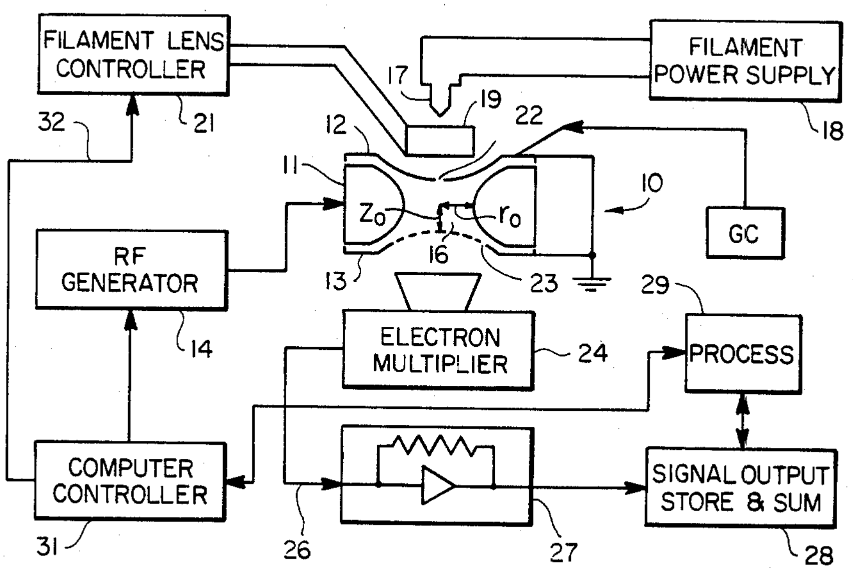
FIG. 1 is a simplified schematic of the quadrupole ion trap embodying the present invention along with a block diagram of the associated electrical circuits.

Referring first to FIG. 1, a three dimensional ion trap is shown at 10. The ion trap includes a ring electrode 11, and two end caps 12 and 13 facing one another. A radio frequency (RF) voltage generator 14 is connected to the ring electrode 11 to supply a radio frequency (RF) voltage V sin $\omega t$ between the end caps and the ring electrode which provides the quadrupole electric field for trapping ions within the ion storage region or volume 16. The storage region has a vertical dimension $z_o$ and a radius $r_o$ (FIG. 1). The required field is formed by coupling the RF voltage between the ring electrode 11 and the two end cap electrodes 12 and 13 which as indicated are grounded. The symmetric fields in the ion trap 10 lead to the stability diagram shown in FIG. 4. The ions that can be trapped depends on the numerical values of the scanning parameters. The relationship of the scanning parameters to the mass to charge ratio of the ions that are stable is described in terms of the parameters "a" and "q" in FIG. 4.

These parameters are defined as:

$$a_z = \frac{-8eU}{m\, r_o^2 \omega^2}$$

$$q_z = \frac{4eV}{m\, r_o^2 \omega^2}$$

where

Figure 4:
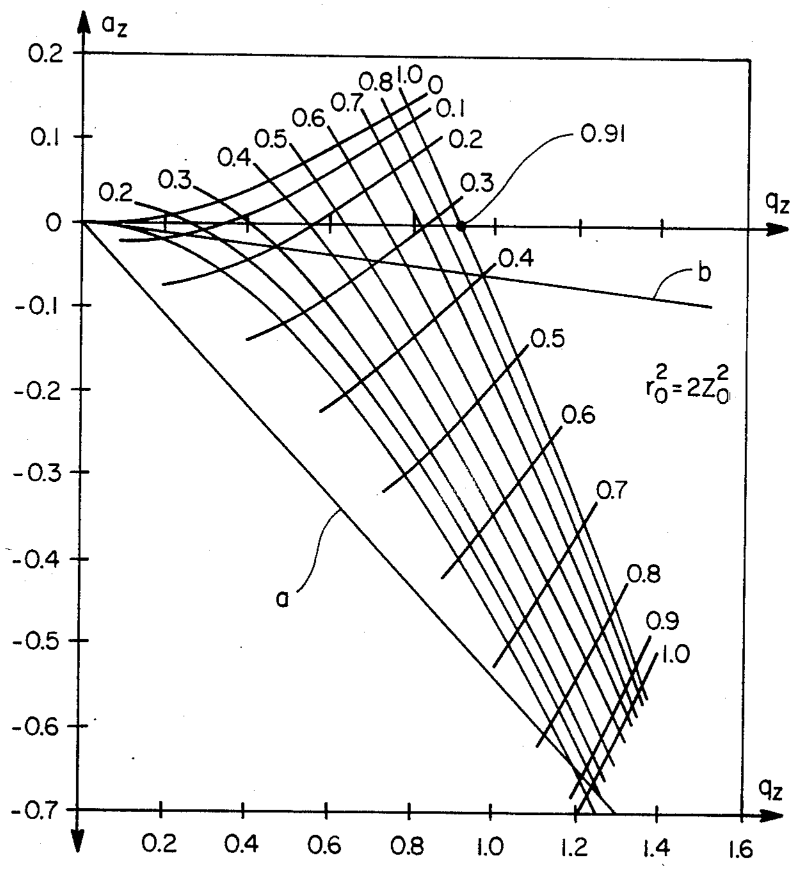
FIG. 4 is a stability envelope for an ion store device of the type shown in FIGS. 1 and 2.

V=magnitude of radio frequency (RF) voltage
U=amplitude of applied direct current (d.c.) voltage
e=charge on charged particle
m=mass of charged particle
$r_o$=distance of ring electrode from center of a three dimensional quadrupole electrode structure symetry axis
$z_o = r_o/\sqrt{2}$
$\omega = 2\pi f$
f=frequency of RF voltage FIG. 4 shows a stability diagram for the ion trap device. For any particular ion, the values of a and q must be within the stability envelope if it is to be trapped within the quadrupole fields of the ion trap device.

The type of trajectory a charged particle has in a described three dimensional quadrupole field depends on how the specific mass of the particle, m/e, and the applied field parameters, U, V, $r_o$ and $\omega$ combine to map on to the stability diagram. If these scanning parameters combine to map inside the stability envelope then the given particle has a stable trajectory in the defined field. A charge particle having a stable trajectory in a three dimensional quadrupole field is constrained to an aperiodic orbit about the center of the field. Such particles can be thought of as trapped by the field. If for a particle m/e, U, V, $r_o$ and $\omega$ combine to map outside the stability envelope on the stability diagram, then the given particle has an unstable trajectory in the defined field. Particles having unstable trajectories in a three dimensional quadrupole field attain displacements from the center of the field which approach infinity over time. Such particles can be thought of as escaping the field and are consequently considered untrappable.

For a three dimensional quadrupole field defined by U, V, $r_o$ and $\omega$, the locus of all possible mass to charge ratios maps onto the stability diagram as a single straight line running through the origin with a slope equal to $-2U/V$. (This locus is also referred to as the scan line.) That portion of the locus of all possible mass to charge ratios that maps within the stability region defines the range of charge to mass ratios particles may have if they are to be trapped in the applied field. By properly choosing the magnitudes of U and V, the range of specific masses of trappable particles can be selected. If the ratio of U to V is chosen so that the locus of possible specific masses maps through an apex of the stability region (FIG. 4, item a) then only particles within a very narrow range of specific masses will have stable trajectories. However, if the ratio of U to V is chosen so that the locus of possible specific masses maps through the middle of the stability region (FIG. 4, item b) then particles of a broad range of specific masses will have stable trajectories.

The present invention operates a three dimensional ion trap device as a mass spectrometer based on mass selective instability, rather than mass selective detection as in Paul's resonance technique or mass selective storage as in Dawson and Whetten's technique. In general terms the new technique is as follows: DC and RF voltage (U, and V cos $\omega t$) are applied to a three-dimensional electrode structure such that ions over the entire specific mass range of interest are simultaneously trapped within the field imposed by the electrodes. Ions are then created or introduced into the quadrupole field area by any one of a variety of well known techniques. After this storage period, the DC voltage, U, the RF voltage V, and the RF frequency, $\omega$, are changed, either in combination or singly so that trapped ions of consecutive specific masses become successively unstable. As each trapped ionic species becomes unstable, all such ions develop trajectories that exceed the boundaries of the trapping field. These ions pass out of the trapping field through perforations in the field imposing electrode structure and impinge on a detector such as an electron multiplier or a Faraday collector. The detected ion current signal intensity as function of time corresponds to a mass spectra of the ions that were initially trapped.

Referring back to FIG. 1, to provide an ionizing electron beam for ionizing the sample molecules which are introduced into the ion storage region 16, there is a filament 17 which may be Rhenium, which is fed by a filament power supply 18. A cylindrical gate electrode and lens 19 is powered by a filament lens controller 21. The gate electrode provides control to gate the electron beam on and off as desired. End cap 12 includes an electron beam aperture 22 through which the beam projects. The opposite end cap 13 is perforated as illustrated at 23 to allow ions which are unstable in the fields of the ion trap to exit and be detected by an electron multiplier 24 which generates an ion signal on line 26. The signal on line 26 is converted from current to voltage by an electrometer 27. It is summed and stored by the unit 28 and processed in unit 29. Controller 31 is connected to the RF generator 14 to allow the magnitude or frequency of the RF voltage to be varied. This provides, as will be described below, for mass selection. The controller on the line 32 gates the filament lens controller 21 to provide an ionizing electron beam only at time periods other than the scanning interval.

Figure 2:
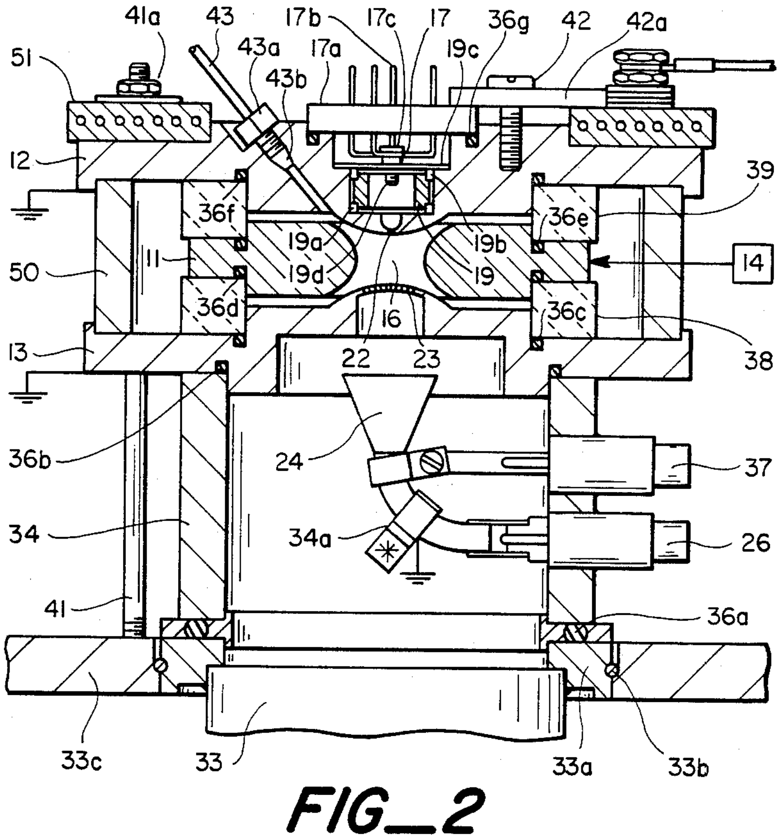
FIG. 2 is an enlarged cross-sectional view of a complete quadrupole ion trap in accordance with the invention.

FIG. 2 illustrates in greater mechanical detail the ion trap 10, of FIG. 1. The major structure is formed by stackable units which are made vacuum tight by O-rings at appropriate joints. The attached pumping unit is a high vacuum pump 33 of standard design with an inlet flange 33*a*. This unit should be sufficient to maintain the vacuum below $1\times10^{-6}$ torr. As discussed below, the optimum pressure range of operation of the present invention is $1\times10^{-1}$ to $1\times10^{-5}$ torr within the ion storage region. It is desirable to maintain the pressure surrounding the electron multiplier below $1\times10^{-4}$ torr. This pressure differential is achieved by means of restrictive perforations 23 in the exit end cap 13. Attached in a groove at the outside diameter of the pump flange is a retaining ring 33*b* which supports the pump in the mounting plate 33*c*. Next in the stack is a cylindrical collar 34 supported on the vacuum pump flange 33 and sealed by O-ring 36*a*. Within collar 34 is a standard high gain electron multiplier 24 having a high voltage feedthrough 37, an ion signal output feedthrough 26, and a grounding clamp 34*a*. The cathode of the electron multiplier 24 is opposite the perforations 23 in the exit end cap 13, through which pass the ejected ions. This exit end cap 13 is essentially a disc-like stainless steel structure which is sealed to the collar 34 by O-ring 36*b*. A ceramic insulating ring 38 is stacked on exit end cap 13 with the associated O-ring 36*c*. A stainless steel RF ring 11 is stacked on ceramic ring 38 and sealed O-ring 36*d*. On top of RF ring 11 is a second ceramic ring 39 sealed with the O-ring 36*e*. A cylindrical RF shield 50 is placed on outer diameter of exit end cap 13 spaced from the ceramic rings and the RF ring. RF power from RF generator 14, FIG. 1, is applied to RF ring 11 through an opening in RF shield 50. Finally, the inlet end cap 12, with its electron beam aperture 22 is tacked on ceramic ring 39 and sealed by O-ring 36*f*. In the central cavity of inlet end cap 12, the cylindrical electron gate 19 is located by the lower gate insulator 19*a* and upper gate insulator 19*b*. The gate 19 and insulators 19*a* and 19*b* are held in position by the electron aperture lens 19*c* and secured by screws, one of which is shown at 19*d*.

Next the filament assembly with dual filament 17 supported on feedthrough pins 17*b* carried by disc-shaped sealed base 17*a* is sealed to inlet end cap 12 by O-ring 36*g*. The filament is backed by a reflector 17*c* mounted to the filament common feedthrough pin. Feedthrough pin 17*b* is straight and extends beyond filament to engage and apply voltage to the electron gate 19. A flat ring heater 51 is placed on inlet end cap 12 to heat for the ion trap device. The heater 51 and filament assembly base 17*a* are held in place by three spaced plates, one of which is shown at 42*a*. The plate 42*a* is secured to inlet end cap 12 by screws, one of which is shown at 42. In addition to the vacuum produced by pump 33, inherently pulling the stacked structure together, it is also held together with the components being in face-to-face contact for tolerance purposes, by four studs, one of which is shown at 41, and nuts shown at 41*a*. The studs 41 extend through inlet end cap 12 into the mounting plate 33*c* allowing a compressive load across the entire stacked structure.

A gas phase sample of a chemical compound such the output of a gas chromatograph (GC) is inputed through the heated sample tube 43, which is sealed to the inlet end cap 12 by a ferrule 43*b* that is compressed by nut 43*a*. A fused quartz tubing from a GC may be threaded through the heated sample tube 43 and terminate near the ion storage region 16 of the ion trap, thus providing a method of transferring the gas phase sample from the GC to the ion trap.

In a preferred embodiment of the invention, the ion storage region 16 has a special use for receiving a sample from a GC, and may have a pressure of $1\times10^{-1}$ to $1\times10^{-5}$ torr. In addition, the GC may have a helium carrier gas. Moreover, such pressure is believed to be an optimum for the operation of the present ion trap device. Naturally, the ion storage region 16 cannot have a pressure significantly different than the pressure on the sample input line 43. If there is a pressure difference, then additional collision gas must be added to increase pressure or a sample splitter employed to reduce pressure.

However, ideally it is desired that there be a continuous online operation between the GC and the ion trap.

Thus, in summary, with the stacked structure shown in FIG. 2, no external vacuum type manifold enclosure is necessary. Also, the structure may be easily disassembled for cleaning when appropriate.

Figure 3:
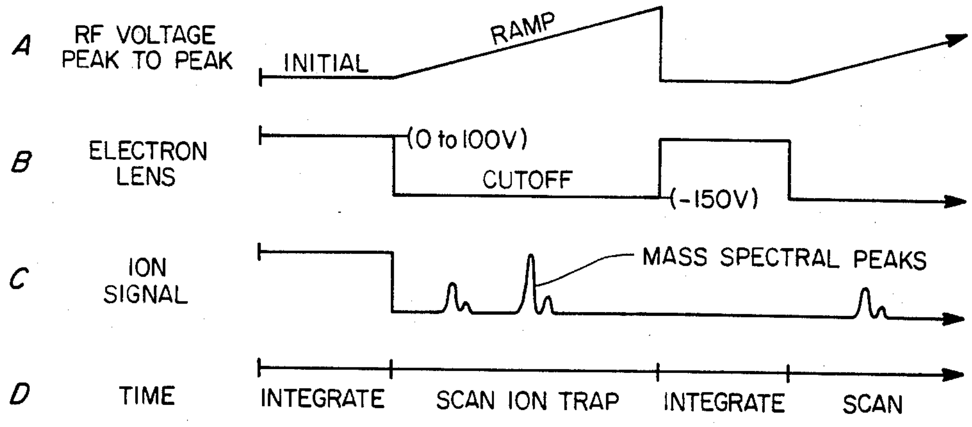
FIGS. 3A through 3D are timing diagrams illustrating the operation of the ion trap as a scanning mass spectrometer.

The three electrode structure in FIGS. 1 and 2 is operated at an initial RF voltage V, FIG. 3A, and a frequency, $\omega$, chosen such that all ions of the specific mass range of interest may be trapped within the imposed quadrupole field. This means that for these initial field conditions ($V_s$, $\omega$) masses in the range of interest must map into the stable region of the stability diagram. Since in this example no d.c. voltage is applied between the ring and end cap electrode ($U_s=0$), the containing field is purely oscillitory (RF only). This means that the locus of possible specific masses maps directly into the $q_z$ axis on the stability diagram. Referring to FIG. 4 it can be seen that ions with specific masses mapping between $q_z=0$ and $q_z=q_{cut\ off}$ ($\sim$0.91) may potentially be trapped in the quadrupole field region. Since the stability parameter $q_z$ varies inversely with specific mass, this means for RF only operation all specific masses greater than the threshold specific mass that maps into $q_{cut\ off}$ are trappable. Thus, in this example the initial trap operating voltage and frequency, $V_s$ and $\omega$ are chosen such that all ions of interest have specific masses greater than the initial threshold specific mass, m/e, that maps to $q_{cut\ off}$.

While maintaining the trap electrodes at this initial voltage and frequency, the electron gun is turned on, FIG. 3B. The electron beam generated by the electron gun enters into the qudrupole field region through a small aperture 22 end cap electrode 12. These electrons collide and ionize neutral molecules residing in the trapping field region. After some time interval the electron beam is turned off and ionization within the trapping field ceases. Ion species created in the trapping field region whose specific masses are less than the cut-off specific mass for the trapping field very quickly (within a few hundreds of field cycles) collide with the field imposing electrodes or otherwise depart from the trapping field region. Ions created in the trapping field that have specific masses above the cut-off specific mass but which have trajectories which are so large as to cause them to impinge on the field imposing electrodes or otherwise leave the field region typically do so in a few hundred field cycles. Therefore several hundred field cycles after termination of ionization few stable or unstable ions are leaving the trapping field and possibly striking the detector 24 behind the lower end cap 13. However, there still remain a significant number of ions contained in the trapping field. The next step is to ramp the magnitude of the trapping field potential, V cos ωt, FIG. 3A. Of course, as the applied voltage, V, is increased, the lower limit of the range of trapped specific masses is increased.

Hence, as the applied RF voltage V increases, stored ions become sequentially unstable in order of increasing specific mass. Ions that become sequentially unstable during this voltage change, do so primarily in the axial direction of motion. This means that as trapped ions attain instability because of the changing trapping field intensity, they rapidly depart the trapping field region in the direction of one or the other end cap electrodes. Since the lower end cap electrode in the device shown in FIGS. 1 and 2 is perforated, as significant percentage of unstable ions transmit through this electrode and strike the detector 24. If the change sweep rate of the RF voltage is chosen so that ions of consecutive specific masses are not made unstable at a rate faster than the rate at which unstable ions depart the trapping field region, the time intensity profile of the signal detected at the electron multiplier, FIG. 3C, will correspond to a mass spectrum of the ions originally stored within the trapping field.

In the above example the three-dimensional ion trap electrodes were driven with a purely RF voltage, and the magnitude of that voltage was changed. However, the basic technique claimed applies equally well to situations where there is an applied d.c. voltage, U, in addition to the RF voltage, V, between the ring electrode and the end cap electrodes. Such operation would just place an upper limit on the range of specific masses that may be mass analyzed in a given experiment. While maintaining a constant ratio between the applied RF and d.c. potentials (U and V) is convenient, in that the magnitudes of the voltages relate linerally to the specific mass of the detected ions, it is not inherent in the technique. While changing one or both of the applied d.c. and RF voltages to mass sequentially destabilize ions is easy to implement, but there is no theoretical reason why one shouldn't manipulate the frequency, ω, of the applied RF trapping voltage or some combination of ω, U and V to accomplish the same thing. While it is convenient from the standpoint of ion collection and detection to have specific mass selected ions become unstable in the axial direction, a three electrode trap operating according to the described principle could be operated so that mass selected ions would have unstable trajectories in the radial directions and reach a detector by transmitting through the ring electrode.

Referring again to FIG. 1, the electrometer 27 converts the current signal to a voltage signal and the ion signal for a particular scan is stored by unit 28. This cycle is repeated, for example, perhaps ten times per minute and unit 28 will sum together ten signals to thus significantly improve the signal-to-noise ratio. Thus, with the ability to sum as many scans as is necessary, the RF scan rate may be increased to relatively high values to thus proportionately increase the signal-to-noise ratio. The summed signal is then transferred to the process unit 29. In addition to improving the signal-to-noise ratio, the summing of several scans helps to interface with the cycle rate of the gas chromatograph or other device which may typically be one per second. Thus, an effective on-line processing of the mass spectral peaks is accomplished with all the attendant benefits.

In accordance with another feature of the invention, the sensitivity and mass resolution are significantly improved by operating with a collision quencing gas such that the total pressure within the ion storage area of the device is in the range of $1\times10^{-1}$ to $1\times10^{-5}$ torr. It is believed that the improvement results from collision of the collision gas molecules with the sample ions within the ion storage region or ion volume 16. Preferably the collision gas is helium. Other different types of inert gas molecules, such as nitrogen, Xenon or argon, may also be suitable for this purpose. For collision gases such as hydrogen, methane, ammonia and other reactive gas, including the sample itself, chemical ionization can occur in the device. It is believed that the use of gases improves sensitivity and mass resolution even when the ion trap device is operated in more typical mass selection modes such as used by the prior art; specifically, the resonance mode or selective mass storage mode.

Figure 5:
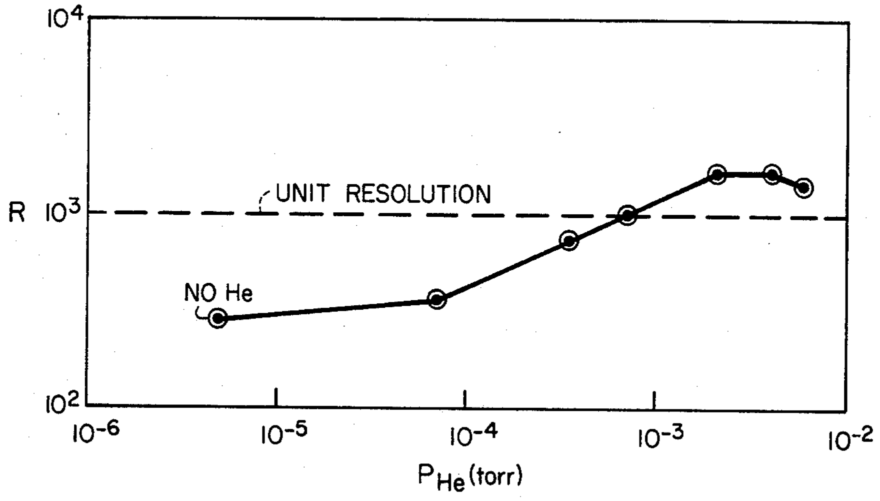
FIG. 5 is a curve showing mass resolution as a function of pressure for a device operated in accordance with the invention.
Figure 6:
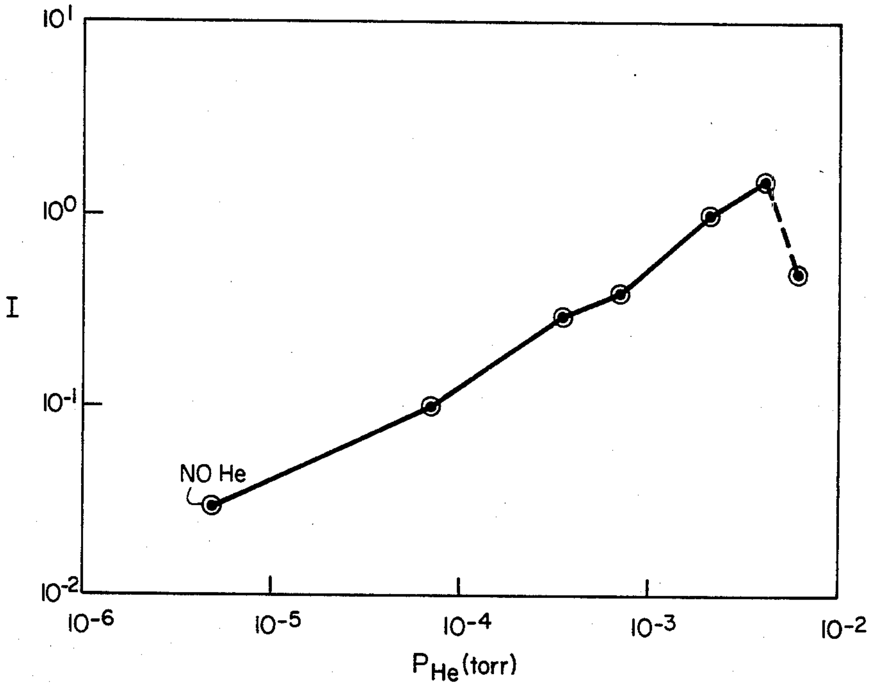
FIG. 6 is a curve showing the increase of ion signal intensity (I) as a function of collision gas pressure for a device operated in accordance with the invention.
Figure 7:
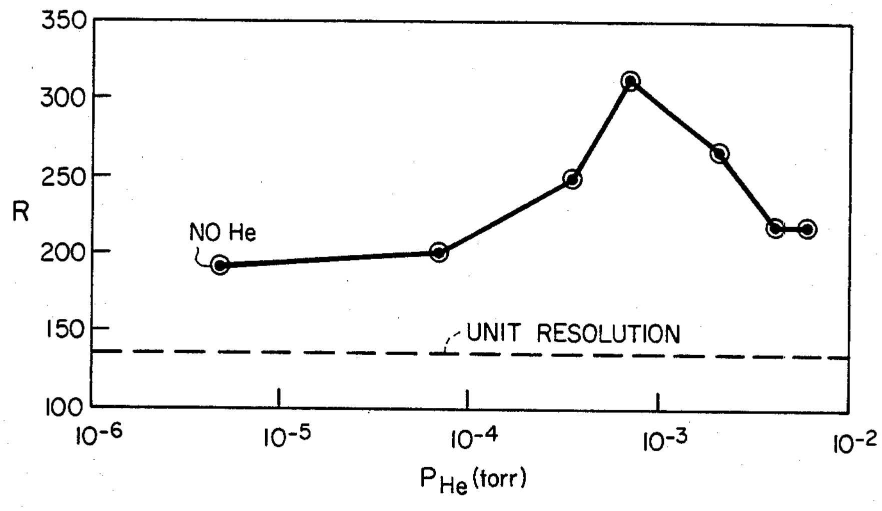
FIG. 7 is a curve showing mass resolution as a function of pressure for a device operated in accordance with the invention.
Figure 8:
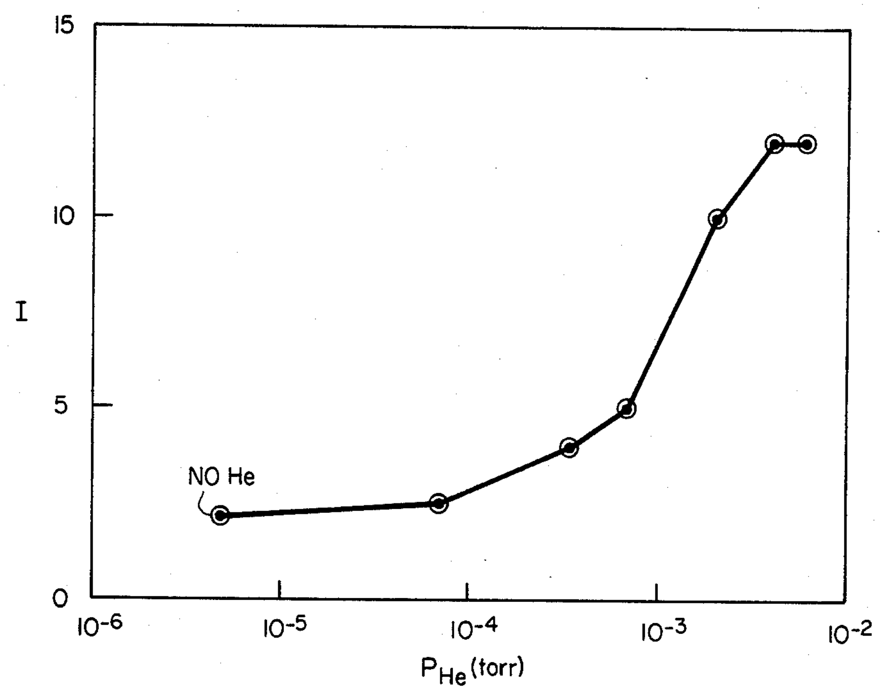
FIG. 8 is a curve showing the increase of intensity (I) as a function of collision gas pressure for a device operated in accordance with the invention.
Figure 9:
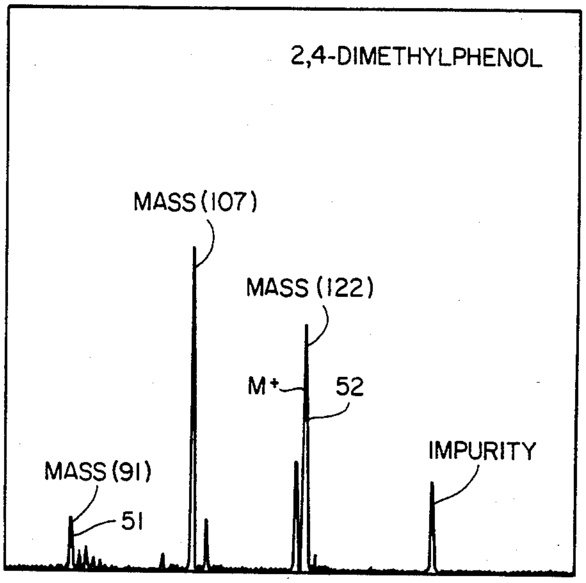
FIG. 9 is a mass spectrogram of 2,4-dimethylphenol taken with a device operated in accordance with the invention.
Figure 10:
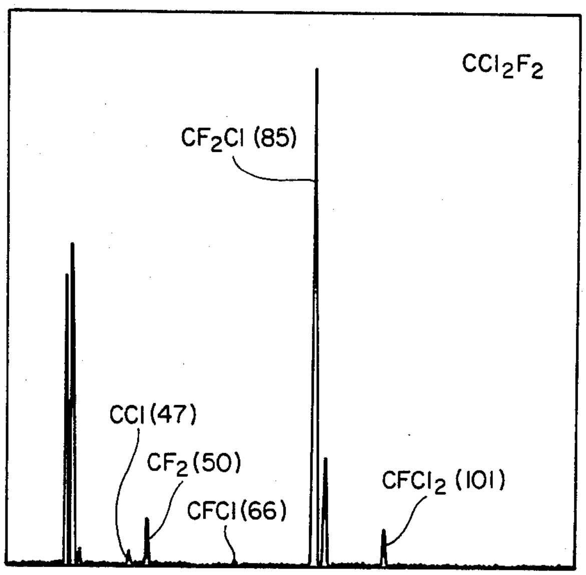
FIG. 10 is a mass spectrogram of Freon 12 taken with a device operated in accordance with the invention.
Figure 11:
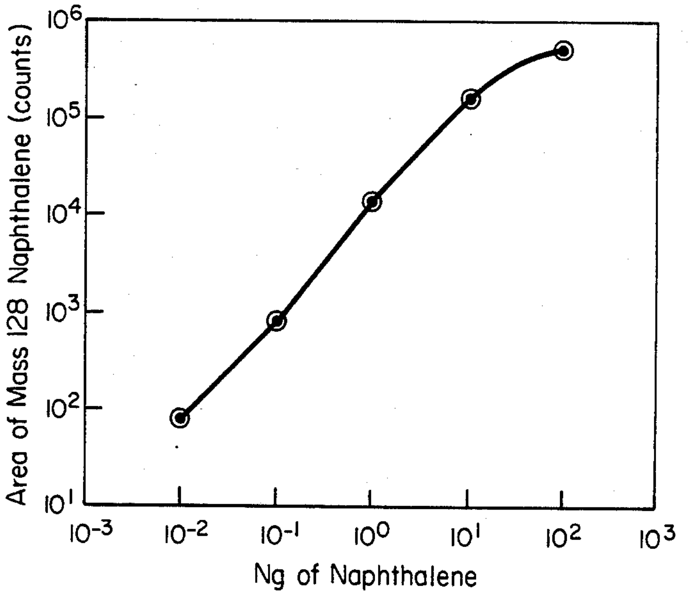
FIG. 11 shows the sensitivity and linearity of a device operated in accordance with the invention for different amounts of naphthalene.
Figure 12:
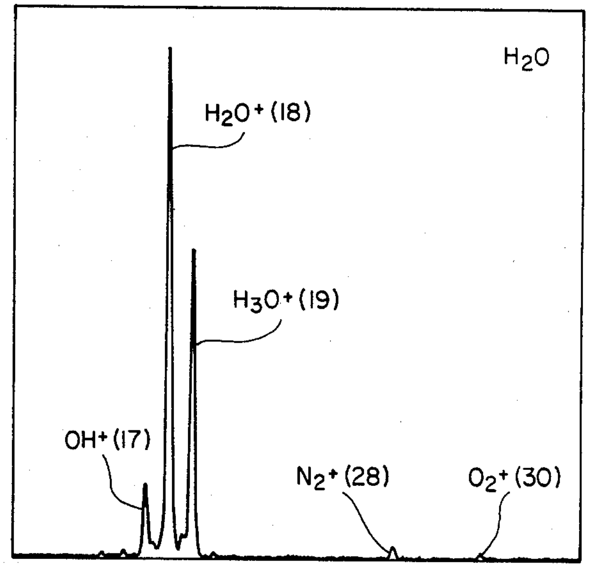
FIG. 12 shows the spectrogram for chemically ionized $H_2O$.

The following examples are illustrative of the increased mass resolution and sensitivity of the ion trap device and the methods of operation in accordance with the present invention. FIG. 5 shows the mass resolution, R, as a function of pressure for perfluorotributylamine (PFTBA) mass 502 where $R=(m/\Delta m)$ is taken at full width half height (FWHH). The initial point at pressure $5\times10^{-6}$ torr shows the resolution without any helium collision gas present. The subsequent points show that the resolution is increased with increasing collision gas pressure. Resolution of 1000 is achieved at a pressure of $7\times10^{-4}$ torr. FIG. 6 shows the increase of intensity (I) for PFTBA mass 502 as a function of collision gas pressure. This is, of course, a measure of sensitivity. The curves of FIGS. 7 and 8 show the same results for mass 69 of PFTBA. FIG. 9 shows the mass spectrum for 2,4-dimethylphenol obtained with equipment as described operated in the scanning mode at the helium collision gas pressure of $2\times10^{-3}$ torr. The peak 51 represents mass 91, peak 52 mass 107 and peak 53 mass 122. FIG. 10 shows the mass spectrum obtained at the pressure $2\times10^{-3}$ torr for Freon 12. The peak 54 represents mass 50, peak 55 represents mass 85 and peak 56 represents mass 101. FIG. 11 shows the sensitivity and linearity of the mass spectrometer operated in accordance with the present invention. The area of mass peak 128 increases linearly with amount of sample from $10^{-2}$ nanograms to 10 nanograms. The extreme sensitivity is also to be noted. FIG. 12 shows a spectrogram taken with a device and method in accordance with the invention in which the ions are formed by chemical ionization (CI). The sample is $H_2O$ at a pressure of $1\times10^{-4}$ torr with helium collision gas at $5\times10^{-5}$ torr. The chemical ionization of water results in $H_3O^+$.

Thus, the method and device of the present invention provides a revolutionary mass spectrometer which is simple and inexpensive in construction and which has extremely high resolution and sensitivity.

Another beneficial fallout of operation at a relatively high pressure compared to operation at pressures of, for example, $1\times10^{-9}$ torr is that the machining tolerances in the construction of the device are not as high. Thus, a device in accordance with the present invention is less expensive to construct.

Although the applied RF voltage is usually sinusoidal, U+V sin ωt they need only be periodic. Different stability diagrams, FIG. 4, would result but would have similar characteristics and would include a scan line. Thus, the RF voltage could comprise square waves, triangular waves, etc. The quadrupole ion trap would nevertheless operate in substantially the same manner.

The preferable ion trap sides have been described as hyperbolic. However, ion traps can be formed with cylindrical or circular trap sides.

The present invention also finds use in combination with other devices such as a so-called MS/MS tandem device. Here two mass spectrometers are tied together in tandem.

The present invention can be used as one device and the other MS device could be a standard quadrupole, ion cyclotron resonance device or other ion trap could also be used.

What is claimed:

1. The method of mass analyzing a sample which comprises the steps of defining a three dimensional quadrupole field in which sample ions over the entire mass range of interest can be simultaneously trapped introducing or creating sample ions into the quadrupole field whereby ions within the range of interest are simultaneously trapped changing the three dimensional trapping field so that the simultaneously trapped ions of consecutive specific masses become sequentially unstable and leave the trapping field and detecting the sequential unstable ions as they leave the trapping field and providing an output signal indicative of the ion mass.

2. The method as in claim 1 in which the field is generated by an ion trap of the type having a ring electrode and spaced end electrodes where the field is defined by U, V and ω where

U=amplitude of direct current voltage between the end electrodes and ring electrode V=magnitude of RF voltage applied between ring elecelectrodes ω=2πf f=frequency of RF voltage.

3. The method of claim 2 in which the three dimensional quadrupole trapping field is changed by changing any one or more of U, V and ω.

4. The method of claim 2 in which the three dimensional quadrupole trapping field is changed by linearly increasing V.

5. The method of claim 2 in which the three dimensional quadrupole trapping field is changed by linearly changing U and V in proportion.

6. The method of claim 1 in which the sample is introduced into the trapping field and then ionized by electron impact ionization.

7. The method of claim 1 in which the sample is introduced into the trapping field and there ionized by chemical ionization.

8. The method of mass analyzing a sample which comprises the steps of:

(a) ionizing the sample to form ions indicative of the sample constituents;

(b) temporarily trapping all of said ions in an ion storage apparatus of the type having two end caps and a ring by applying voltage U+V sin ωt across the ring and end caps to provide a substantially quadrupole electric field;

(c) scanning one or more of U, V and ω between predetermined limits so that trapped ions of specific mass become sequentially and selectively unstable and sequentially exit from the ion trap; and (d) detecting the unstable ions as they exit the ion trap to provide an indication of the ions as a function of U, V and ω applied to thereby identify the mass of the ions.

9. The method of claim 8 wherein U is set to zero and only V is scanned.

10. The method of claim 8 wherein only U is scanned.

11. The method of claim 8 wherein U and V are scanned.

12. A method as in claim 8 including the step improving the sensitivity and mass resolution by providing a collision gas in said field.

13. A method as in claim 12 wherein said improving step includes introducing said sample into said storage apparatus along with collision gas molecules and allowing said gas molecules to collide with sample ions in the ion storage region.

14. A method as in claim 12 where the ion storage region is maintained at a collision gas pressure in the range of $1\times10^{-1}$ to $1\times10^{-5}$ torr.

15. A method as in claim 13 where said collision gas molecules are helium.

16. A method as in claim 13 where said collision gas molecules are Xenon or argon.

17. A method of mass analyzing a sample comprising the steps of:

(a) ionizing the sample to form ions indicative of the sample constituents;

(b) temporarily trapping all of said ions in a three dimensional quadrupole field;

(c) improving the mass resolution and sensitivity of said analysis of trapped ion by introduction of collision gas, and (d) sequentially selecting by ejecting ion of different mass values by scanning the three dimensional quadrupole field.

18. A method of mass analyzing a sample which comprises the steps of:

applying RF and d.c. voltages V+U sin ωt between the ring electrode and the end cap electrodes of an ion trap electrode structure to impose in the region interior to said electrode structure a potential distribution approximating a three dimensional quadrupole field which is described in the cartesian coordinate system by the equation $$\Phi = \tfrac{1}{2}(U' + V' \sin \omega t)\frac{x^2 + y^2 - 2Z^2}{r_o'^2}$$

where

Φ=the electric potential relative to the electric potential at the origin (x=0, y=0, Z=0)

V'=a magnitude describing RF component of the electric potential field

ω=2πf f=frequency of radio frequency component of the electric potential field

V'=a magnitude describing the d.c. component of the electric potential field $r_o'$=characteristic dimension of the potential field and which has ion trapping characteristics defined by the parameters $S_a$ and $S_q$ where $$S_a = \frac{U'}{\omega^2 r_o'^2} \text{ and } S_1q = \frac{V'}{\omega^2 r_o'^2}$$

introducing ions into all three dimensional quadrupole field region and trapping said ions having masses of interest;

changing $S_q$ so that the range of ion specific masses (m/e) stable in the field changes causing trapped ions to become unstable and exit the trapping field in sequence of said ions specific masses (m/e);

detecting the unstable ions; and providing a signal indicative of the m/e ratio as the ions become unstable.

19. The method as in claim 18 where $S_a$ is changed instead of $S_q$.

20. The method as in claim 18 in which $S_a$ and $S_q$ are changed simultaneously.

21. An ion trap mass spectrometer for mass analyzing a sample which has been ionized and the ions of interest are temporarily trapped in ion storage apparatus of the type having two end caps and a ring by applying RF and/or DC potentials across the ring and end caps to provide a substantially quadrupole electric field; said ion storage apparatus comprising a conductive circular RF ring; two disc-like conductive end caps one with an electron beam aperture and the other highly perforated for allowing the sequential ejection of ions of consecutive specific masses as the RF and/or DC potentials are varied, a pair of insulating rings, a plurality of O-rings, and a vacuum pump, said perforated end cap being stacked on said pump, a ceramic ring on such end, said RF ring on such ceramic ring, the other ceramic ring on said RF ring, the other end cap on such other ceramic ring, all of said components being sealed together by said O-rings; and means for holding said stacked components together, whereby no overall vacuum tight enclosure is necessary.

22. Apparatus as in claim 21 where an electron multiplier for receiving ions exiting from said ion storage region is placed to receive ions ejected through said perforated end cap.

23. Apparatus as in claim 19 where said end cap with said electron beam aperture includes an election gun assembly sealed to such end cap by use of a said O-ring.

* * * * *